United States Patent Office 2,952,664
Patented Sept. 13, 1960

2,952,664
CATALYZED PROCESS FOR THE PRODUCTION OF POLYETHYLENE TEREPHTHALATE EMPLOYING A CATALYST SYSTEM OF MANGANOUS FORMATE AND SILICO TUNGSTIC ACID

James B. Ballentine, Decatur, Ala., assignor to The Chemstrand Corporation, Decatur, Ala., a corporation of Delaware No Drawing. Filed Apr. 11, 1955, Ser. No. 500,687
9 Claims. (Cl. 260—75)

This invention relates to an improved method for preparing a synthetic linear polyester, such as the condensation product of a polyhydric alcohol and a dibasic acid. More particularly, the invention is concerned with an improved method for the preparation of polyethylene terephthalate.

Synthetic linear condensation polyesters derived from glycols and dibasic acids, which are capable of being drawn into pliable, strong fibers showing, by characteristic X-ray patterns, orientation along the fiber axis, are well known. Having such properties, these polyesters have proven to be of considerable value commercially, and particularly is this true of those polyesters formed from terephthalic acid and a glycol of the series $HO(CH_2)_nOH$ where $n$ is an integer from 2 to 10 inclusive. One of the most attractive polyesters or polymers of this class is polyethylene terephthalate. One of the best methods of producing polyethylene terephthalate involves an ester interchange between ethylene glycol and dimethyl terephthalate to form bis-2-hydroxylethyl terephthalate monomer which is then polymerized to polyethylene terephthalate under reduced pressure and at elevated temperatures.

However, difficulties have been encountered in the manufacture of polyethylene terephthalate by the ester interchange reaction. Obviously highly purified dimethyl terephthalate and highly purified ethylene glycol are preferred starting materials in order to form a uniform high quality product. It has been noted, however, that even these highly purified materials are very sluggish with respect to ester interchange and in the case of less purified reagents, the reaction is still too slow for practical commercial operation. Because of this slow rate of reaction, it has been found to be essential, in commercial operation, to employ a suitable catalyst to speed up the reaction.

Many catalysts have heretofore been proposed for the ester interchange reaction in the manufacture of polyethylene terephthalate. These catalysts have not proven to be entirely satisfactory since fibers and filaments produced from the condensation polymers using said heretofore known catalysts, do not possess the desired whiteness or lack of color. In addition, many of the known catalysts are not capable of producing condensation polymers having a sufficiently high molecular weight within a commercially feasible period of time. Therefore, there has been a great desire in the art to find an ester interchange catalyst which not only speeds up the reaction into the realm of that considered necessary for economic commercial operation and which is useful over approximately the entire range of molecular weights desired in the finished polymer but also, a catalyst which produces a condensation polymer of good color.

Accordingly, it is a primary object of the present invention to provide a new and improved process for producing polyethylene terephthalate which overcomes the disadvantages of prior art processes and produces a product of improved properties, particularly improved color in the condensation polymer and in articles produced therefrom.

It is another object of the invention to provide new catalysts which accelerate the ester interchange reaction between ethylene glycol and dimethyl terephthalate and produce polyethylene terephthalate having excellent whiteness.

It is a still further object of the invention to improve the reactions involved in the production of fiber and filament-forming linear condensation polyesters formed from ethylene glycol and dimethyl terephthalate with respect to accelerating the same by means of new catalysts.

Other objects and advantages of the present invention will be apparent from the description thereof hereinafter.

In general, the objects of the present invention are accomplished by conducting the ester interchange reaction between ethylene glycol and dimethyl terephthalate, and the subsequent polymerization of the resulting bis-2-hydroxyethyl terephthalate, in the presence of catalytic amounts of manganous formate or a mixture of manganous formate and silico tungstic acid, which has the formula:

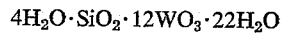
$$4H_2O \cdot SiO_2 \cdot 12WO_3 \cdot 22H_2O$$

In the preparation of polyethylene terephthalate, by means of the ester-interchange reaction, the method comprises two steps. In the first step, ethylene glycol and dimethyl terephthalate are reacted at elevated temperatures and atmospheric pressure to form bis-2-hydroxyethyl terephthalate monomer and methanol, which is removed continuously by distillation. Thereafter, in the second step, the bis-2-hydroxyethyl terephthalate is heated at still higher temperatures and under reduced pressure to form the polyethylene terephthalate with the elimination of glycol, which is readily volatilized under these conditions and removed from the system. The second step, or polymerization step, is continued until a fiber-forming polymer having the desired degree of polymerization, determined by viscosity measurements, is obtained. Without the aid of a suitable catalyst, the above reactions do not proceed at a noticeable rate.

The present invention proposes conducting both steps of the above-identified reaction in the presence of catalytic amounts of manganous formate or a mixture of manganous formate and silico tungstic acid. A reasonably wide range of catalyst concentration may be employed, irrespective of whether manganous formate is used alone or in admixture with silico tungstic acid, for example, 0.001 to 1.0% by weight, based on the weight of the dimethyl terephthalate. When the catalyst mixture is employed, it should preferably contain 0.01 to 0.10% by weight of manganous formate and 0.01 to 0.1% of silico tungstic acid. However, it is preferred to employ the catalyst, whether it be the single catalyst or catalyst mixture, in the range of 0.01 to 0.05% by weight.

During the first stage or initial condensation a simple ester-interchange takes place with the formulation of bis-2-hydroxyethyl terephthalate. This portion of the reaction is carried out at atmospheric pressure and at a temperature in the range of 100° to 250° C. and preferably between 150° and 220° C. If desired, the reaction may be carried out at pressures above or below atmospheric. Atmospheric pressure is preferred, however. During this first stage, methanol is evolved which is continually removed by distillation. At the completion of the first stage, the excess glycol, if any, is distilled off prior to entering the second stage of the reaction.

The second stage, or polymerization stage, is conducted at reduced pressures. For optimum results, a pressure within the range of less than 1 mm. up to 5 mm. of mercury is employed. This reduced pressure is necessary to remove the free ethylene glycol that is formed during this stage of the reaction. The ethylene glycol is volatilized under these conditions and removed from the system. The polymerization step is conducted at a temperature within the range of 220° to 300° C. It is desirable to maintain a nitrogen blanket over the reactants in order to prevent oxidation, said nitrogen containing less than 0.003% oxygen.

The polymerization step or second stage may be effected either in the liquid, melt or solid phase. In the liquid phase, particularly, reduced pressures must be employed in order to remove the free ethylene glycol which emerges from the polymer as a result of the condensation reaction.

When employing procedures heretofore known in the art, the ester interchange portion of the reaction, or first step, has taken place in approximately 3 to 6 hours. However, when employing the process of the instant invention, using the new catalysts enumerated herein, the ester interchange takes place in ¾ to 1½ hours. Likewise, the polymerization or second step has heretofore taken place in approximately 2 to 4 hours, depending on catalyst concentration, temperature, viscosity desired, amount of color allowable in the finished polymer, etc. With the present process the polymerization step takes place in approximately 1 to 3 hours when employing the new catalysts of the present invention and the conditions of reaction recited hereinbefore.

The linear condensation polyesters, produced in accordance with the present invention, have a melt viscosity of approximately 1000 to 6000 poises. This represents the fiber- and filament-forming polymers. It is to be understood, of course, that non fiber-forming polyesters may be produced by means of the present invention, which have a greater or less melt viscosity than that reiterated above. For example, polyesters which are useful in coating compositions, lacquers, and the like.

Melt viscosity of the polymer, as referred to herein, is measured by timing the flow of the molten polymer through a glass tube between two reference points marked on the tube by applying a known pressure difference, as measured by a manometer. This is a direct application of Flory's method, and by using the following expression, the melt viscosity in poises can be determined.

$$\text{Melt viscosity (poises)} = \Delta P_{\text{corr.}} \cdot t \cdot C$$

where $\Delta P_{\text{corr.}}$ = corrected pressure differential (mm.)
$t$ = time to flow between reference points (seconds)
$C$ = calibrated constant $$\Delta P_{\text{corr.}} = \Delta P - \frac{D(H_1 + H_2)}{27.6}$$

where $\Delta P$ = observed pressure differential
$H_1$ = height (mm.) of lower reference point above melt surface
$H_2$ = height (mm.) of upper reference point above melt surface
$D$ = density of molten polymer at the temperature of the melt $$C = \frac{106A}{h_2^2 - h_1^2}$$

where $A$ = cross-section area of tube in cm.$^2$
$h_1 = H_1$ in cm.
$h_2 = H_2$ in cm.

When employing the catalysts of the instant invention, melt viscosities which are much higher than those possible with prior art catalysts are obtainable.

To further illustrate the present invention and the advantages thereof, the following examples are given, it being understood that these are merely intended to be illustrative and not limitative. Unless otherwise indicated, all parts and percents are by weight.

EXAMPLE I

A mixture or charge of 41 grams of dimethyl terephthalate, 44 ml. of ethylene glycol and 20 mg. of manganous formate (Mn(HCOO)$_2$) were placed in a reaction vessel fitted with a distilling column and heated under a nitrogen atmosphere at approximately 178° C. for a period of 1½ hours. The methanol formed during the reaction was distilled out of the reaction vessel. After all the methanol was removed, the temperature of the reaction mixture was raised to 287° C. for a period of 30 minutes in order to remove by distillation the excess glycol in the vessel. The system was then placed under a vacuum and the pressure therein reduced to less than 1 mm. mercury while maintaining the temperature at 287° C. The polymerization was allowed to proceed for approximately 3 hours to form a polymer in the fiber-forming range. The ethylene glycol, formed during the polymerization reaction, was distilled off and collected. The polymer obtained had a melt viscosity of 1940 poises at 287° C. Upon cooling the polymer, a white solid resulted. A control polymer was made in accordance with the above procedure using zinc acetate as a catalyst which is one of the best catalysts employed heretofore in this type reaction. The control polymer so obtained had a melt viscosity of 1074 poises at 287° C. thus showing the superior product obtainable with the catalyst of the present invention.

EXAMPLE II

In this example a charge of 41 grams of dimethyl terephthalate, 44 ml. of ethylene glycol, 20 mg. of manganous formate and 15 mg. of silico tungstic acid (4H$_2$O.SiO$_2$.12WO$_3$.22H$_2$O)

was placed in a reaction vessel and heated at 178° C. for 1½ hours, as outlined in Example I. The temperature was then raised to 287° C. to remove excess glycol and thereafter the pressure in the vessel was reduced to less than 0.3 mm. mercury and the temperature maintained at 287° C. for a period of 3 hours. The polyethylene terephthalate obtained in this example had a melt viscosity of 2900 poises at 287° C. This shows that the addition of silico tungstic acid to the reaction mass increases the rate of reaction over that when manganous formate is employed alone. This is particularly advantageous in those cases where a high molecular weight polymer is desired.

EXAMPLE III

In this example, a series of runs were made in order to compare the instant new polymerization catalysts with a well known prior art catalyst, namely, zinc borate (3ZnO.2B$_2$O$_3$). The results obtained are tabulated in the table below. In all of the runs made, the monomer charge was 41 parts of dimethyl terephthalate and 49 parts of ethylene glycol. The temperature in the first stage, until all the methanol was removed, was 177° C. and in the second or polymerization stage, the temperature was 286° C. and the pressure was reduced to about 0.1 mm. mercury. The catalysts were employed during both stages of the reaction.

Table

| Run No. | Time of First Stage (All Methanol Removed) | Time of Second Stage (Polymerization) | Percent Catalyst Based on Weight of Dimethly Terephthalate* | Melt Viscosity in Poises |
|---|---|---|---|---|
| | hours | hours | | |
| 1A | 2 | 3 | 0.025/0.025 MF/STA | 2890 |
| 2A | 1.5 | 3 | 0.05/0.05 MF/STA | 3520 |
| 3A | 1.5 | 3 | 0.10/0.10 MF/STA | 5910 |
| 1B | 1.5 | 3 | 0.036 MF | 2360 |
| 2B | 1.5 | 3 | 0.06 MF | 3000 |
| 3B | 1.0 | 3 | 0.10 MF | 3220 |
| 1C | 1.5 | 3 | 0.036 ZB | 1460 |
| 2C | 1.5 | 3 | 0.06 ZB | 1340 |
| 3C | 1.5 | 3 | 0.10 ZB | 1130 |

*MF—Manganous Formate. STA—Silico Tungstic Acid. ZB—Zinc Borate.

It can readily be seen from the above results that the use of manganous formate increases the melt viscosity of the polymer about twofold over that obtainable with zinc borate and the combination of silico tungstic acid and manganous formate increases the melt viscosity still further, under approximately the same conditions of reaction. Silico tungstic acid alone was found not to be an efficient polyester catalyst, and particularly in concentrations of 0.10% and lower.

The catalysts of the instant invention are more reactive or produce greater activity than catalysts proposed heretofore for the manufacture of polyethylene terephthalate by the ester interchange route. This increased catalyst activity is clearly evidenced by the almost immediate release of methanol during the first stage of the reaction. The increased activity of the instant catalysts is in part due to the fact that they are soluble in the reaction mixture, whereas some of the prior art catalysts, for example, zinc borate, are not readily soluble and tend to built up in activity as they dissolve. Likewise, the various oxides proposed heretofore as catalysts are very sluggish in activity. These factors affect the color of the finished product since the longer the reaction mass is submitted to high temperatures, the more likely it is that discoloration of the polymer and articles produced therefrom will result.

The polymers produced by the present invention and shaped articles produced therefrom, such as fibers, filaments, films, and the like, are whiter than polymers and shaped articles produced by prior art procedures. One skilled in the art will be readily cognizant of this particular advantage. This is particularly true in the textile field where in order to dye goods in pastel shades, a white fiber or yarn is necessary, since when a yarn is off-color when spun, off-color shades will result when such yarn, or material made therefrom, is dyed. The use of off-color yarn necessitates a bleaching step which increases the cost and very often detracts from other desirable properties of the product.

Another important advantage of the instant new catalysts is that they are not affected by the amount of water that is normally present in ethylene glycol which also contributes to the improved and superior color of the finished product. Since the instant catalysts are not affected by the water normally present during the esterification, there is faster activity during the first stage of the reaction which also contributes to the superior color of the finished product. Numerous other advantages of the instant invention will be apparent to those skilled in the art.

It is to be understood that changes and variations may be made in the present invention without departing from the spirit and scope thereof as defined in the appended claims.

I claim:

1. In the process for producing polyethylene terephthalate wherein ethylene glycol is reacted under ester interchange conditions with dimethyl terephthalate and the resulting glycol terephthalate is polymerized, the improvement which comprises carrying out the ester interchange reaction and the polymerization reaction in the presence of a catalyst system comprising essentially 0.1 to 0.10 percent manganous formate and 0.01 to 0.10 percent silico tungstic acid.

2. In the process for producing polyethylene terephthlate wherein ethylene glycol is reacted under ester interchange conditions with dimethyl terephthalate and the resulting glycol terephthalate is polymerized, the improvement which comprises carrying out the ester interchange reaction and the polymerization reaction in the presence of a catalyst system consisting essentially of 0.01 to 0.10 percent manganous formate and 0.01 to 0.10 percent silico tungstic acid.

3. A process for producing polyethylene terephthalate comprising reacting ethylene glycol and dimethyl terephthalate in the presence of a catalyst system comprising essentially 0.01 to 0.10 percent manganous formate and 0.01 to 0.10 percent silico tungstic acid at a temperature in the range of 100° to 250° C. until no further methanol is liberated and then continuing the reaction in the presence of said catalyst system at a temperature in the range of 220° to 300° C. and under reduced pressure until the thus-formed polyethylene terephthalate has a melt viscosity of 1000 to 6000 poises.

4. A process for producing polyethylene terephthalate comprising reacting ethylene glycol and dimethyl terephthalate in the presence of a catalyst system consisting essentially of 0.01 to 0.10 percent manganous formate and 0.01 to 0.10 percent silico tungstic acid at a temperature in the range of 100° to 250° C. until no further methanol is liberated and then continuing the reaction in the presence of said catalyst system at a temperature in the range of 220° to 300° C. and under reduced pressure until the thus-formed polyethylene terephthalate has a melt viscosity of 1000 to 6000 poises.

5. The process as defined in claim 3 wherein the reduced pressure is in the range of less than 1 mm. up to 5 mm. of mercury.

6. The process as defined in claim 3 wherein the reaction at 100° to 250° C. is conducted for ¾ to 1½ hours and the reaction at 220° to 300° C. is conducted for about 1 to 3 hours.

7. The process as defined in claim 6 wherein a reduced pressure is in the range of less than 1 mm. up to 5 mm. of mercury.

8. In the process for producing bis-2-hydroxyethyl terephthalate, the improvement comprising reacting ethylene glycol with dimethyl terephthalate in the presence of a catalyst system comprising essentially 0.01 to 0.10 percent manganous formate and 0.01 to 0.10 percent silico tungstic acid at a temperature in the range of 100° to 250° C. until no further methanol is liberated.

9. The process as defined in claim 8 wherein the reaction at 100° to 250° C. is conducted for ¾ to 1½ hours.

References Cited in the file of this patent

UNITED STATES PATENTS

| | | |
|---|---|---|
| 2,402,486 | Adelson et al. | June 18, 1946 |
| 2,578,660 | Auspos | Dec. 18, 1951 |

UNITED STATES PATENT OFFICE

CERTIFICATE OF CORRECTION

Patent No. 2,952,664 September 13, 1960

James B. Ballentine

It is hereby certified that error appears in the printed specification of the above numbered patent requiring correction and that the said Letters Patent should read as corrected below.

Column 6, line 1, for "0.1" read -- 0.01 --.

Signed and sealed this 4th day of April 1961.

(SEAL)
Attest: ERNEST W. SWIDER

Attesting Officer

ARTHUR W. CROCKER
Acting Commissioner of Patents